United States Patent [19]
Nitta

[11] Patent Number: 6,028,028
[45] Date of Patent: Feb. 22, 2000

[54] RECORDING SHEET

[75] Inventor: Katsukuni Nitta, Tokyo, Japan

[73] Assignee: Oji-Yuka Synthetic Paper Co., Ltd., Tokyo, Japan

[21] Appl. No.: 08/755,338

[22] Filed: Nov. 22, 1996

[30] Foreign Application Priority Data

| Nov. 30, 1995 | [JP] | Japan | .................................... 7-334346 |
| Dec. 13, 1995 | [JP] | Japan | .................................... 7-346300 |
| Mar. 26, 1996 | [JP] | Japan | .................................... 8-094685 |

[51] Int. Cl.$^7$ .................................................. B41M 5/40
[52] U.S. Cl. ...................... 503/200; 428/195; 428/304.4; 428/423.1; 442/208; 442/261; 503/226; 503/227
[58] Field of Search ................................. 428/195, 304.4, 428/423.1; 442/208, 261; 347/105; 503/200, 226

[56] References Cited

U.S. PATENT DOCUMENTS

| 4,500,897 | 2/1985 | Matsuda et al. | .......................... 503/209 |
| 5,108,834 | 4/1992 | Asazuma | .................................. 428/323 |
| 5,122,413 | 6/1992 | Ohno et al. | ............................. 428/319.9 |
| 5,185,213 | 2/1993 | Fujita et al. | .............................. 428/500 |
| 5,196,391 | 3/1993 | Ohno et al. | ............................... 503/200 |
| 5,474,966 | 12/1995 | Asazuma et al. | ......................... 503/200 |
| 5,494,735 | 2/1996 | Nitta | ......................................... 428/207 |
| 5,496,790 | 3/1996 | Ohno et al. | .............................. 503/227 |
| 5,496,791 | 3/1996 | Ohno et al. | .............................. 503/227 |

*Primary Examiner*—Bruce H. Hess
*Attorney, Agent, or Firm*—Sughrue, Mion, Zinn, Macpeak & Seas, PLLC

[57] ABSTRACT

Recording sheets are disclosed which comprise a support (I) having formed on a surface thereof an image-recording/receiving layer (II) selected from an ink-receiving layer (IIa) for receiving a water-based ink ejected by an ink-jet recording technique, a thermosensitive recording layer (IIb), a coating layer (IIc) for laser printing and a thermal transfer image-receiving layer (IId). The support (I) has a laminated structure comprising a plain weave fabric (A) and, bonded thereto with an adhesive, a water-proof stretched resin film (B) having a machine-direction Clark stiffness (S value) of from 8 to 300, a transverse-direction Clark stiffness of from 8 to 300 and a thickness of from 20 to 300 μm. The image-recording/receiving layer (II) is provided on the support on the side where the stretched resin film layer (B) is present. The inventive recording sheets have a tough surface and have both excellent ink absorption and clarity of developed color. Also, the inventive recording papers are water-proof, provide a water-proof image and have excellent tear resistance.

17 Claims, 1 Drawing Sheet

RECORDING SHEET

FIELD OF THE INVENTION

The present invention relates to a recording sheet having excellent printability, water-proofness, tear resistance, sewability and non-curling properties.

The recording sheet according to the present invention includes an ink-jet recording sheet, a thermosensitive recording sheet, a laser printing sheet and a thermal transfer image-receiving recording sheet. These materials are useful for outdoor posters, signboards, hanging advertising leaflets, flags, aprons, shop curtains and disposable clothing.

BACKGROUND OF THE INVENTION

A recording sheet comprising a support made mainly of a bleached chemical pulp and, formed on the surface thereof, a coating layer selected from a thermosensitive recording layer, a coating layer for laser printing, and a thermal transfer image-receiving layer is known, and has been put to practical use.

The above recording sheet is disadvantageous in that it has inferior water-proofness and inferior high-speed printability due to the support made of the bleached chemical pulp having a rough surface. In view of the above, a recording sheet has been proposed employing as a support a synthetic paper consisting of a microporous stretched resin film. Another recording sheet has been proposed employing as a support a laminate of the above synthetic paper with either a paper made mainly of a bleached chemical pulp or a biaxially stretched poly(ethylene terephthalate) film. These proposed recording sheets have been put to practical use (see JP-B-7-20739 (the term "JP-B" as used herein means an "examined Japanese patent publication"), JP-A-63-222891 (the term "JP-A" as used herein means an "unexamined published Japanese patent application"), JP-B-4-60437, JP-A-1-197763, JP-A-4-119879, JP-A-4-219277, and U.S. Pat. Nos. 4,778,782, 4,971,950 and 5,306,690).

On the other hand, the technology of ink-jet color printers is progressing in which color hard copies are produced at a high speed by ink-jet recording. To obtain a high-quality recorded image, many ink-jet recording sheets have been proposed for water-based ink which comprise a support consisting of a paper made of a bleached chemical pulp so as to enable a water-based ink delivered to the recording sheet to be rapidly absorbed in the thickness direction without spreading on the surface. Furthermore, provided on the surface of the support, an ink-receiving layer is formed from a composition comprising a pigment consisting mainly of synthetic silica particles, a water-based adhesive containing poly(vinyl alcohol) (including a silanol-modified poly (vinyl alcohol)), and an ink-setting agent comprising a cationic polymer (see, for example, JP-A- 55-51683, JP-A-56-148586, JP-A-7-89216, and JP-A-7-89217). These ink-jet recording sheets have been put to practical use.

The ink-jet recording sheets described above have problems in that both the ink-receiving layer and the support made of a bleached chemical pulp absorb water. Thus, the recording sheets require a prolonged drying time after printing, and the resulting prints suffer from rumpling and curling.

To solve these problems, the use of a support has been proposed having a biaxially stretched poly(ethylene terephthalate) film (see JP-A-7-76162) or a synthetic paper consisting of a stretched resin film containing fine inorganic particles (see JP-A-7-89218 and JP-B-6-62003). Ink-jet recording sheets employing these supports have been put to practical use.

However, even in an ink-jet recording sheet employing the latter stretched film as a support, a further reduction in drying time is desired.

Moreover, the use of the prior art recording sheets, including ink-jet recording sheets, thermosensitive recording sheets, recording sheets for laser printing, and recording sheets for thermal transfer image reception, as posters and advertising leaflets after printing has the following problems. When such posters and leaflets are tacked on a board or hung, the recording sheets flutter in a strong wind and tear from the tack marks which form notches. In addition, the hanging leaflets which are fluttering in a wind may hitch on a nearby nail or wire to tear from the resulting scar which forms a notch.

SUMMARY OF THE INVENTION

An object of the present invention is to provide a recording sheet which not only has high non-curling properties after printing so that it does not curl upon unwinding after storage from a roll, but which also has excellent tear resistance.

The above objects of the present invention are achieved by providing a recording sheet which comprises a support (I) having formed on a surface thereof an image-recording/receiving layer (II) selected from an ink-receiving layer (IIa) for receiving an ink-jet printing ink, a thermosensitive recording layer (IIb), a coating layer (IIc) for laser printing and a thermal transfer image-receiving layer (IId), said support (I) is selected from (Ia) a support having a laminated structure comprising a woven fabric (A) having a basis weight of from 50 to 200 g/m$^2$ which is a plain weave fabric woven of warp threads of 40 to 150 denier at 50 to 140 ends per inch (2.54 cm) and weft threads of 40 to 150 denier at 50 to 140 picks per inch and interlaced for every thread and, bonded thereto on one or both sides with an adhesive, a water-proof stretched resin film (B) having a machine-direction Clark stiffness (S value; JIS P-8143) of from 8 to 300, a transverse-direction Clark stiffness of from 8 to 300 and a thickness of from 20 to 300 μm, and (Ib) a support having a laminated structure comprising a nonwoven fabric sheet (A') as a back layer which is either a nonwoven fabric sheet having a basis weight of from 12 to 80 g/m$^2$ obtained by heating and pressing a nonwoven fabric web comprising interlocking short fibers, or a fiber-reinforced nonwoven fabric sheet having a basis weight of from 60 to 200 g/m$^2$ obtained by one or both of sprinkling a thermoplastic resin powder and superposing a thermoplastic resin sheet on the nonwoven fabric web and then heating and pressing the resulting structure to unite the thermoplastic resin with the web and, bonded to the surface of the back layer with an adhesive, a water-proof stretched resin film (B) having a machine-direction Clark stiffness (S value) of from 8 to 300, a transverse-direction Clark stiffness of from 8 to 300, and a thickness of from 20 to 300 μm, said image-recording/receiving layer (II) being provided on the support (I) on the side where the stretched resin film layer (B) is present.

DETAILED DESCRIPTION OF THE INVENTION

Figure 1:
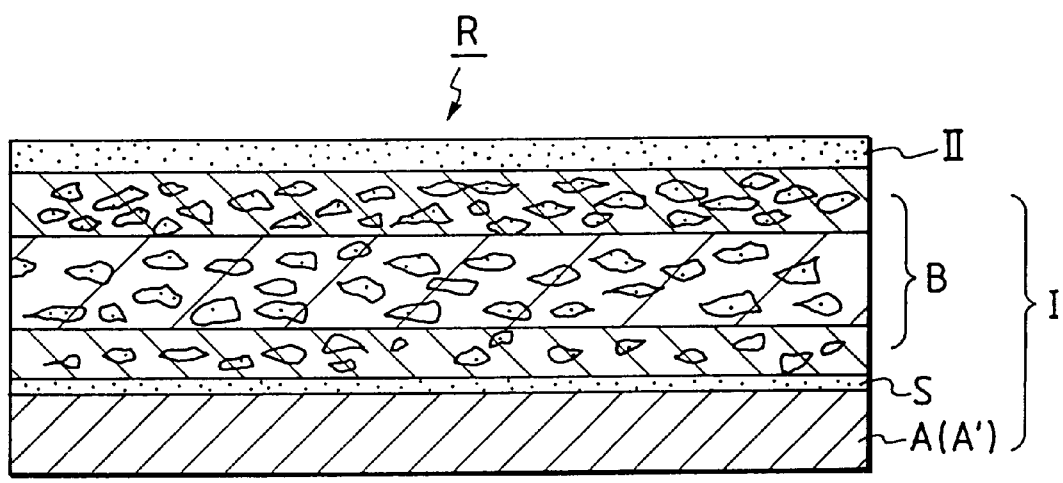
FIG. 1 is a sectional view of a recording sheet R, including support I, image-recording/receiving layer II, plain weave fabric A, nonwoven fabric sheet A', stretched resin film B and adhesive S.

The recording sheets of the present invention provide prints which do not rumple, even when used outdoors, e.g., as campaign posters, because the stretched resin film (B) contained in the support is water-proof. Furthermore, because the support has a layer of either a plain weave fabric or a nonwoven fabric, the recording sheets are less apt to suffer problems with regard to sheet feeding and discharge during printing. Furthermore, the plain weave fabric or nonwoven fabric not only improves tear resistance to prevent the prints obtained therefrom from tearing even when fluttering in a strong wind, but also prevents thermal curling after printing.

Moreover, the ink-jet recording sheet according to the present invention has the following advantages. Since the stretched resin film (B) of the support (I) is water-proof, the recording sheet provides a print which resists rumpling. The support back layer, which is a plain weave fabric or a nonwoven fabric sheet, contributes to a reduction in drying time. This is because the recording sheet has a larger surface area in contact with air than synthetic papers having the same thickness. Furthermore, curling is prevented due to the presence of the plain weave fabric (A) or the nonwoven fabric sheet (A'). Hence, the recording sheet can be stored or transported in the form of a roll, and even after unwinding for use, the unwound recording sheet does not curl and remains flat. As a result, there is no need to hot iron or carry out another procedure to correct curling after unwinding as required by prior art ink-jet recording sheets employing a paper made of a pulp or a synthetic paper as a support.

The recording sheets of the present invention are explained below in detail.

Support

The support on which an image-recording/receiving layer (II) is formed is a laminated sheet comprising a plain weave fabric (A) or a nonwoven fabric (A') and, bonded thereto on one or both sides with an adhesive, a water-proof stretched resin film (B).

Plain Weave Fabric (A)

The woven fabric which imparts tear resistance, sewability and resistance to thermal curling recording sheet is a plain weave fabric (PONGEE) which is woven of warp and weft threads of 40 to 150 denier, preferably 50 to 100 denier. Interlaced for every thread, the number of the warp threads (ends) and weft threads (picks) each is from 50 to 140, preferably from 60 to 100, per inch. The woven fabric has a basis weight of from 50 to 200 g/m$^2$, preferably from 50 to 100 g/m$^2$.

Useful examples of the material of the warp and weft threads constituting the plain weave fabric include nylon 6, nylon 6,6, poly(ethylene terephthalate), cotton, rayon, polyacrylonitrile, poly(fluoroethylene), polypropylene and poly(vinylidene fluoride).

The warp threads and the weft threads may have the same or different finenesses in the range of from 40 to 150 denier. From the standpoint of smoothness, they preferably have the same fineness. For the purpose of reinforcement, one or two warp and/or weft threads having a larger diameter than the others may be interlaced per inch.

If warp or weft threads having a fineness below 40 denier are used for plain weaving, the resulting woven fabric is costly. On the other hand, warp or weft threads having a fineness exceeding 150 denier are undesirable in that they provide a woven fabric having a rough surface which results in a decrease in print gloss. If warp or weft threads are woven at less than 50 ends or picks per inch, high print gloss cannot be obtained. This is because of the increased area of each space surrounded by warp threads and weft threads, even though the woven fabric may have high adhesion strength to the stretched resin film. On the other hand, a plain weave fabric having more than 140 ends or picks per inch is disadvantageous in that the adhesion strength between the plain weave fabric and the stretched resin film is too low to prevent the recording sheet from suffering delamination on flapping in a strong wind when used as a hanging advertising leaflet or a signboard.

Although the basis weight of the woven fabric varies depending on the density and fineness of the warp and weft threads and on the number of ends or picks, it is from 50 to 200 g/m$^2$, preferably from 50 to 100 g/m$^2$.

Besides plain weaving, there are various weaving techniques including twilling, satin weaving, knitting, diagonal weaving, polo weaving and lace weaving. However, plain weaving is the most desirable from the standpoint of print appearance.

Nonwoven Fabric Sheet (A')

The nonwoven fabric sheet obtained by heating and pressing a nonwoven fabric web comprising interlocking short fibers can be produced by known processes as described, e.g., in JP-B-37-4993, JP-A-53-10704, JP-A-53-90404, JP-A-53-119305, JP-A-53-122803, JP-A-56-15500, JP-A-57-29700, JP-A-57-39299, JP-A-59-70600, JP-A-57-61796 and JP-A-57-139597.

The nonwoven fabric sheet is usually produced by dispersing split short fibers (fineness, 0.2–15 denier; fiber length, 1–20 mm) of a thermoplastic resin, e.g., polyethylene, polypropylene, a polyamide or a polyester, into water, forming the resulting stock into a web using a wire cylinder, and then heating and pressing the web at 120 to 270° C. and 5 to 200 kg/cm$^2$ with rolls or a press. This kind of nonwoven fabric sheet is manufactured by Teijin Ltd., Japan, and sold under the trade name of SPUN BOND #UNISEL (including types RT, B and BT).

In the above-described web forming process, pulpy particles may be incorporated into the stock in an amount of from 10 to 90% by weight. Examples of useful materials for the pulpy particles include aromatic polyamides and aromatic polyesters. Fibers of poly(vinyl alcohol) or a powder of a thermoplastic resin, e.g., polyethylene, a polyester, a polyamide or polypropylene, may also be added as a binder for the short fibers in an amount of from 5 to 30% by weight. Furthermore, other additives such as, e.g., a pigment plasticizer, anti-blocking agent and dispersant may be added.

The basis weight of the nonwoven fabric sheet is in the range of from 12 to 80 g/m$^2$. Basis weights thereof smaller than 12 g/m$^2$ are insufficient to prevent curling. If the basis weight thereof exceeds 80 g/m$^2$, the anti-curling effect cannot be further enhanced and only results in increased cost.

A nonwoven fabric sheet having a thickness that is too large is undesirable in that the recording sheet, when rolled for storage, has an increased roll diameter.

The nonwoven fabric sheet may also be produced by sprinkling a thermoplastic resin powder on and/or superposing a thermoplastic resin sheet on the nonwoven fabric web obtained by the web forming process, and then heating and pressing the resulting structure to unite the thermoplastic resin with the web. Examples of the thermoplastic resin used as the powder or sheet include polyethylene, polypropylene, poly(vinyl chloride), poly(vinylidene chloride), polystyrene, styrene-butadiene-acrylonitrile copolymers, polyamides, copolyamides, polycarbonates, polyacetals, poly(methyl methacrylate), polysulfones, poly(phenylene oxide), polyesters, copolyesters, poly(phenylene sulfide), polyetheretherketones, polyethersulfones, polyetherimides, polyamide imides, polyimides, polyurethanes, polyetheresters, polyetheramides and polyesteramides. A mixture of two or more of these may be used.

The nonwoven fabric sheet may also be a synthetic paper consisting of a nonwoven self-bonded-web fabric obtained by the process described in JP-B-48-32986. Specifically, this synthetic paper is produced by forming a web comprising irregularly disposed polymer filaments which are made of a crystalline and oriented synthetic organic polymer and at least 75% by weight of which have a textile denier, and exposing the web to a heated fluid in which the filaments are insoluble, whereby the filaments are self-bonded at many intersections disposed at spatial intervals. In this process, the exposure to the fluid, which has a pressure not lower than atmospheric pressure, is conducted at a temperature in the range of $T_x(1\pm0.03)°$ C., where $T_x$ is the critical bonding temperature as defined in the specification. During this exposure, the temperature of the web is kept constant so that the variation in web temperature is within the range of 5° C. in any three-dimensional directions. Furthermore, the web is kept under a compressive force sufficient to regulate the filament shrink at the bonding temperature so as not to exceed 20% and to prevent the filaments from undergoing a decrease in birefringence of greater than 50%. Subsequent to the exposure, the web is cooled to a temperature sufficient to prevent the filaments from shrinking, before the compressive force is removed. This nonwoven-fabric synthetic paper is manufactured by E.I. du Pont de Nemours & Co., Inc., U.S.A, and sold under the trade name of "TYVEK".

These fiber-reinforced nonwoven fabric sheets (A') for use in the present invention have a basis weight of from 60 to 200 g/m².

Stretched Resin Film (B)

The stretched resin film, which functions to facilitate recording sheet feeding to printers and recording sheet discharge therefrom, is a water-proof film having a Clark stiffness (JIS P-8143; S value) of from 8 to 300 in each of the machine and transverse directions and a thickness of from 20 to 300 µm.

If the Clark stiffness of the stretched resin film is lower than 8, the film has insufficient strength holding its shape. As a result, the recording sheet not only is difficult to handle during feeding to an ink-jet printer, discharge therefrom, etc., but also is apt to rumple during storage. A Clark stiffness exceeding 300 is disadvantageous in that the recording sheet is difficult to store as a roll and can be stored only in the form of a stack of flat sheets.

Examples of the stretched resin film include a stretched film of a thermoplastic resin, such as polypropylene, high-density polyethylene, poly(ethylene terephthalate), or a polycarbonate, and a microporous synthetic paper comprising a stretched resin film having microvoids therein. The stretched resin film has an opacity (JIS P-8138) of 85% or higher, preferably 90% or higher, a void volume of from 10 to 60%, preferably from 15 to 45%, as calculated according to the following equation (1), and a thickness of from 30 to 300 µm, preferably from 50 to 150 µm.

$$\text{Void volume } (\%)=(\rho_0-\rho)/\rho_0\times100 \tag{1}$$

$\rho_0$: density of the unstretched resin film $\rho$: density of the stretched resin film Specific examples of the microporous synthetic paper include the synthetic papers given below under (1) to (3).
(1) Biaxially stretched microporous thermoplastic resin films containing 8 to 65 wt % inorganic or organic filler (see, for example, JP-B-54-31032 and U.S. Pat. Nos. 3,775,521, 4,191,719, 4,377,616, and 4,560,614).
(2) Synthetic papers comprising a base layer consisting of a biaxially stretched thermoplastic film and a paper-like layer consisting of a uniaxially stretched thermoplastic resin film containing 8 to 65 wt % fine inorganic particles (see, for example, JP-B-46-40794, JP-A-57-149363, and JP-A-57-181829).

The above synthetic papers may have a two-layer structure, a three-layer structure in which a uniaxially stretched film as a paper-like layer is laminated on each side of a base layer (see JP-B-46-40794 and U.S. Pat. No. 4,318,950), a three- to seven-layer structure which contains one or more different resin film layers each interposed between a paper-like layer and a base layer (see JP-B-50-29738, JP-A-57-149363, JP-A-56-126155, JP-A-57-181829, and U.S. Pat. No. 4,472,227), or a multilayer structure which is composed of at least three layers including a heat-sealable back layer comprising a resin having a lower melting point than the base layer resin, such as a propylene-ethylene copolymer, a metal (e.g., Na, Li, Zn, or K) salt of an ethylene-(meth)acrylic acid copolymer, or a chlorinated polyethylene (see JP-B-3-13973).

A three-layered synthetic paper is produced, for example, by uniaxially stretching a thermoplastic resin film containing up to 30 wt %, preferably 8 to 25 wt %, fine inorganic particles at a temperature lower than the melting point of the resin to obtain a uniaxially oriented film, laminating a film of a molten thermoplastic resin containing 8 to 65 wt % fine inorganic particles to each side of the uniaxially oriented film, and then stretching the laminated sheet in the direction perpendicular to the direction of the above uniaxial stretching. The synthetic paper thus obtained is a laminate composed of a biaxially oriented base layer sandwiched between two paper-like layers which each is a uniaxially oriented film having many microvoids.
(3) Printable synthetic papers having high gloss produced by laminating a transparent thermoplastic resin layer having a thickness of 0.1 to 20 µm and containing no fine inorganic particles to the synthetic papers described in (2) above on the paper-like layer side (see JP-B-4-60437, JP-B-1-60411, JP-A-61-3748, and U.S. Pat. No. 4,663, 216). Examples thereof include: a synthetic paper which comprises a multilayered support film composed of a biaxially stretched thermoplastic resin film as a base layer and front and back layers each comprising a uniaxially stretched thermoplastic resin film containing 8 to 65 wt % fine inorganic particles, a transparent thermoplastic resin film layer provided on the front layer side of the support and containing no fine inorganic particles, and a primer coat layer having an antistatic function (see JP-A-61-3748); and a multilayered synthetic paper comprising a biaxially stretched thermoplastic resin film as a base layer and, provided on at least one side thereof, a laminate of a paper-like layer consisting of a uniaxially stretched thermoplastic resin film containing 8 to 65 wt % fine inorganic particles with a surface layer consisting of a uniaxially stretched thermoplastic resin film. The thickness (t) of the surface layer and the average particle diameter (R) of the fine inorganic particles in the paper-like layer satisfying the relationship (2) shown below (see JP-B-1-60411).

$$R \geq t \geq 1/10 \times R \quad (2)$$

Like the synthetic papers (2), the multilayered synthetic papers (3) may have a heat-sealable layer on the back side.

Examples of thermoplastic resins useful as materials for the synthetic paper include polyolefin resins such as polyethylene, polypropylene, ethylene-propylene copolymers, and poly(4-methylpentene-1), polystyrene, polyamides, poly(ethylene terephthalate), partial hydrolyzates of ethylene-vinyl acetate copolymers, ethylene-acrylic acid copolymers and salts (K, Na, Li, Zn, Al) thereof, vinylidene chloride copolymers such as vinyl chloride-vinylidene chloride copolymers, vinyl chloride-alkyl acrylate copolymers, and mixtures thereof. Preferred among these from the standpoint of water-proofness and chemical resistance are polypropylene and polyethylene. When polypropylene is used as a material for a base layer, it is preferred to incorporate thereinto 3 to 25 wt % thermoplastic resin having a lower melting point than that of the polypropylene, such as, e.g., polyethylene, polystyrene, or an ethylene-vinyl acetate copolymer, to thereby ensure satisfactory stretchability.

Examples of useful fine inorganic particles include calcium carbonate, calcined clay, silica, diatomaceous earth, talc, titanium oxide and barium sulfate each having a particle diameter of from 0.03 to 16 μm. The stretch ratio is preferably from 4 to 10 in each of the machine and transverse directions. Stretching temperatures are from 150 to 162° C. for a propylene homopolymer (melting point, 164–167° C.), from 110 to 120° C. for high-density polyethylene (melting point, 121–124° C.), and from 104 to 115° C. for poly(ethylene terephthalate) (melting point, 246–252° C.). The stretching speed is from 50 to 350 m/min.

If the void volume of the synthetic paper is less than 10%, the weight reduction in the support is insufficient. If the void volume thereof exceeds 60%, the synthetic paper has insufficient strength (tensile strength and flexural strength) for practical use.

The thickness of the synthetic paper is from 20 to 300 μm. Microporous synthetic papers having a thickness smaller than 20 μm are difficult to produce. Synthetic papers having a thickness exceeding 300 μm are difficult to supply to the market in the form of a roll, because such thick papers should be transported after being packaged as cut sheets of type A0, A1, B0, B1, A3, medium octavo, or other sizes.

Adhesive

A liquid anchor coating agent can be used as the adhesive. Examples thereof include polyurethane-based anchor coating agents such as EL-150 (trade name) and a BLS-2080A/BLS-2080B mixture and polyester-based ones such as AD-503 (trade name), all manufactured by Toyo Morton K.K., Japan. The anchor coating agent is applied at a spread rate of 0.5 to 25 g/m².

A hot-melt adhesive can also be used. Examples thereof include ethylene-vinyl acetate copolymers, low-density polyethylene, a metal salt of an ethylene-(meth)-acrylic acid copolymer (also called SURLYN), chlorinated polyethylene and chlorinated polypropylene. It is necessary to employ a thermoplastic resin having a melting point lower than the stretching temperature used in production of the stretched resin film. If a hot-melt adhesive is used at a temperature higher than the stretching temperature, the stretched resin film may shrink.

In the case where the anchor coating agent described above is used for bonding, the anchor coating agent is applied to either one or both of a plain weave fabric (A) or nonwoven fabric sheet (A') and a stretched resin film (B) and they are press bonded. In the case of using a hot-melt adhesive, the bonding may be accomplished by extruding a melt of the hot-melt adhesive into a film form with a die to laminate the same to either of a plain weave fabric (A) or a nonwoven sheet (A') and a stretched resin film (B), and then bonding the other of the sheet (A or A') and film (B) thereto by means of pressure rolls. Alternatively, the bonding may be accomplished by laminating a film of the molten adhesive to a nonwoven fabric web comprising interlocking short fibers which is to be heated and pressed for producing a nonwoven fabric sheet, subsequently superposing a stretched resin film thereon, and then pressing the resulting structure with rolls.

Opacifying Layer

In the case of using a stretched resin film (B) having insufficient opacity, show-through can be prevented by conducting solid black printing on one or each side of the stretched resin film (B) by offset or gravure printing to form an opacifying layer (D) having a thickness of 1 to 5 μm. Alternatively, show-through can be prevented by a method in which an adhesive (anchor coating agent) containing a large quantity (5–75% by weight) of a white filler, e.g., whiskers or fine particles of titanium oxide, is applied at a spread rate of 2 to 10 g/m² to bond the stretched resin film (B) to a plain weave fabric (A) or a nonwoven fabric sheet (A') to thereby obtain a support having an opacity (JIS P-8138) of 100%.

The thickness of the support (I) is from 80 to 500 μm, preferably from 100 to 300 μm.

Image-Recording/Receiving Layer (II)

The image-recording/receiving layer (II) can be formed on the stretched resin film layer (B) as a surface layer of the support (I) described above by applying a coating composition which gives any of an ink-receiving layer (IIa) for an ink-jet recording technique in which an image is recorded with a water-based or hot-melt ink, a thermo-sensitive recording layer (IIb) having the property of assuming a color, a coating layer (IIc) for laser printing, and a thermal transfer image-receiving layer (IId).

The coating composition for forming an ink-receiving layer, the coating composition used for forming a thermo-sensitive recording layer and containing a color former and a color developer, the coating composition for forming a thermal transfer image-receiving layer, or the coating composition for forming a coating layer for laser printing is generally applied with a brush, roller, pad, or spray gun or by dipping or other means. The resulting coating is dried at a temperature sufficient to volatilize or vaporize the coating solvent.

Specifically, in the case of roller coating, the coating composition is a solution prepared in a solvent. The coating composition is applied to the surface of the stretched film (B) as a surface layer of the support (I) by means of a rotating roll in contact with a roll partly immersed in the coating fluid placed in a tank.

Ink-receiving Layer for Ink-jet Recording (IIa)

The ink-receiving layer (IIa) is a layer formed from a composition comprising a pigment as a main component, a water-based adhesive and an ink-setting agent. The composition preferably comprises, on a solid basis, from 50 to 88 wt % inorganic pigment, from 10 to 40 wt % water-based adhesive, and from 2 to 20 wt % ink-setting agent.

Examples of the pigment include synthetic silica, alumina hydrosol, talc, calcium carbonate and clay. Preferred among these are porous synthetic silica and alumina hydrosol.

Examples of the water-based adhesive include poly(vinyl alcohol), silanol-containing ethylene-vinyl alcohol copolymers, polyvinylpyrrolidone, ethylene-vinyl acetate copolymers, methyl ethyl cellulose, poly(sodium acrylate) and starch. Preferred of these are poly(vinyl alcohol) and silanol-containing ethylene-vinyl alcohol copolymers in the case where the pigment is porous synthetic silica or alumina sol.

Examples of the ink-setting agent include quaternary ammonium salts of polyethylenimine, acrylic copolymers containing comonomer units having a quaternary ammonium group and epichlorohydrin adducts of polyamine-polyamides.

The ink-receiving layer can be formed on the support by applying a coating composition containing the ingredients described above to the stretched resin film layer (B) of the support at a spread rate of from 5 to 50 g/m$^2$, preferably from 10 to 30 g/m$^2$ (on a solid basis), and then drying the coating.

If desired and necessary, the dried coating layer may be supercalendered to smooth the coating layer (ink-receiving layer).

Thermosensitive Recording Layer (IIb)

The thermosensitive recording layer (IIb) can be formed by coating a coating composition containing a color former and a color developer and drying the coating.

Examples of the color former and the color developer which can be used in the thermosensitive recording layer (IIb) include those described below. Any of the combinations of these color formers and these color developers can be used, so long as a color reaction takes place when they are brought into contact with each other. Examples of the combinations which can be used in the present invention include the combinations of colorless or light color basic dyes and inorganic or organic acid materials, the combination of metal salts of higher fatty acids such as iron (III) stearate and phenols such as gallic acid and the combination of diazonium compounds, couples and basic materials.

(a) Color Formers

Various known compounds can be used as the colorless or light color basic dyes used as the color formers in the thermosensitive recording layer.

Examples of the compounds which can be used as the color formers in the present invention include triallyl-methane dyes such as 3,3-bis(p-dimethylaminophenyl)-6-dimethylaminophthalide, 3,3-bis(p-dimethylaminophenyl)-phthalide, 3-(p-dimethylaminophenyl)-3-(1,2-dimethylindol-3-yl)phthalide, 3-(p-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-6-dimethylaminophthalide, 3,3-bis(2-phenylindol-3-yl)-6-dimethylaminophthalide, 3-p-dimethyl-aminophenyl-3-(1-methylpyrrol-3-yl)-6-dimethylaminophthalide, etc.; diphenylmethane dyes such as 4,4'-bisdimethylaminobenzhydryl benzyl ether, N-halophenyl-leucoauramine, N-2,4,5-trichlorophenyl-leucoauramine, etc.; thiazine dyes such as benzoyl leucomethylene blue, p-nitrobenzoyl leuco-methylene blue, etc.; spiro dyes such as 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho(6'-methoxybenzo)-spiropyran, 3-propyl-spiro-dibenzopyran, etc.; lactam dyes such as Rhodamine-B anilinolactam, Rhodamine(p-nitroanilino)lactam, Rhodamine(o-chloroanilino)lactam, etc.; and fluoran dyes such as 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-N-acetyl-N-methylaminofluoran, 3-diethylamino-7-N-methylaminofluoran, 3-diethylamino-7-dibenzylaminofluoran, 3-diethylamino-7-N-methyl-N-benzylaminofluoran, 3-diethylamino-7-N-chloroethyl-N-methylaminofluoran, 3-diethylamino-7-N-diethylaminofluoran, 3-(N-ethyl-p-toluidino)-6-methyl-7-phenylaminofluoran, 3-(N-cyclopentyl-N-ethylamino)-6-methyl-7-anilinofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-(N-cyclohexyl-N-methylamino)-6-methyl-7-phenylaminofluoran, 3-piperidino-6-methyl-7-phenylaminofluoran, 3-piperidino-6-methyl-7-p-butylphenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, 3-pyrrolidino-6-methyl-7-p-butylphenylaminofluoran, 3-N-methyl-N-tetrahydrofurfurylamino-6-methyl-7-anilinofluoran, 3-N-ethyl-N-tetrahydrofurfurylamino-6-methyl-7-anilinofluoran, etc.

(b) Developers

Various compounds are known for use as the inorganic or organic acid materials that are brought into contact with the basic dyes to form color.

Examples of the inorganic acid materials include activated clay, terra alba, attapulgite, bentonite, colloidal silica and aluminum silicate.

Examples of the organic acid materials include phenolic compounds such as 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylenebis(4-methyl-6-tert-isobutylphenol), 4,4'-isopropylidenebis(2-tert-butylphenol), 4,4'-sec-butylidenediphenol, 4-phenylphenol, 4,4'-isopropylidenediphenol (bisphenol A), 2,2'-methylenebis(4-chlorophenol), hydroquinone, 4,4'-cyclohexylidenediphenol, benzyl 4-hydroxybenzoate, dimethyl 4-hydroxyphthalate, hydroquinone monobenzyl ether, novolak phenol resins, phenol polymers, etc.; aromatic carboxylic acids such as benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl)salicylic acid, 3-chloro-5-(α-methylbenzyl)salicylic acid, 3,5-di-tert-butylsalicylic acid, 3-phenyl-5-(α,α-dimethylbenzyl) salicylic acid, 3,5-di-α-methylbenzylsalicylic acid, etc.; and the salts of the foregoing phenolic compounds or aromatic carboxylic acids with polyvalent metals such as zinc, magnesium, aluminum, calcium, titanium, manganese, tin, nickel, etc.

(c) Weight Ratio

The basic dyes (color formers) and the developers may be used either alone or in a combination of two or more thereof. The ratio of the basic dyes to the developers depends on the types of basic dyes and developers that are used. However, the developers are generally used in an amount of about 1 to 20 parts by weight, preferably about 2 to 10 parts by weight, per one part by weight of the basic dyes.

(d) Coating Composition

The coating composition containing these materials is generally prepared by uniformly or separately dispersing the basic dye (color former) and the developer in water, as a dispersion medium, by stirring and grinding means such as a ball mill, an attritor, a sand mill, etc.

The coating composition generally contains a binder such as starch, hydroxyethyl cellulose, methyl cellulose, carboxymethyl cellulose, gelatin, casein, gum arabic, polyvinyl alcohol, acetoacetyl group-modified polyvinyl alcohol, a diisobutylene/maleic anhydride copolymer salt, a styrene/maleic anhydride copolymer salt, an ethylene/acrylic acid copolymer salt, a styrene/butadiene copolymer emulsion, a urea resin, a melamine resin, an amide resin, an amino resin, etc., in an amount of from about 2 to 40% by weight, and preferably from about 5 to 25% by weight of the total solid components.

(e) Other Compound Additives

The coating composition may contain various additives. Examples of the additives include dispersants such as sodium dioctyl sulfosuccinate, sodium salt of decylbenzenesulfonate, sodium salt of lauryl alcohol sulfuric ester and metal salts of fatty acids; ultraviolet light absorbers such as benzophenone ultraviolet absorbers; antifoaming agents, fluorescent dyes, colored dyes and electrically conductive materials.

Furthermore, the coating composition may optionally contain waxes such as zinc stearate, calcium stearate, polyethylene wax, carnauba wax, paraffin wax, ester wax, etc.; fatty acid amides such as stearic acid amide, stearic acid methylenebisamide, oleic acid amide, palmitic acid amide, coconut fatty acid amide, etc.; hindered phenols such as 2,2'-methylenebis(4-methyl-6-tert-butylphenol), 1,1,3-tris(2-methyl-4-hydroxy-5-tert-butylphenyl)butane, etc.; ultraviolet absorbents such as 2-(2'-hydroxy-5'-methylphenyl)benzotriazole, 2-hydroxy-4-benzyloxybenzophenone, etc.; esters such as 1,2-di(3-methylphenoxy)ethane, 1,2-diphenoxyethane, 1-phenoxy-2-(4-methylphenoxy)ethane, terephthalic acid dimethyl ester, terephthalic acid dibutyl ester, terephthalic acid dibenzyl ester, p-benzyl-biphenyl, 1,4-dimethoxynaphthalene, 1,4-diethoxynaphthalene, 1-hydroxynaphthoic acid phenyl ester, etc.; various kinds of known thermoplastic substances, and inorganic pigments such as kaoline, clay, talc, calcium carbonate, calcined clay, titanium oxide, diatomaceous earth, fine granular anhydrous silica, active clay, etc.

A thermosensitive recording sheet can be formed by providing the thermosensitive recording layer (IIb) containing the color former and the color developer on the surface of the surface layer (B) of the support (I) for thermosensitive recording.

The thermosensitive recording layer (IIb) of the thermosensitive recording sheet of the present invention can be formed by coating the coating composition using air knife coating, blade coating, etc., followed by drying without particular limitation.

The coating weight of the coating composition is usually 2 to 12 g/m², preferably 3 to 10 g/m² on a dry basis, although there is no particular limitation with regard to the coating weight of the coating composition.

An overcoat layer may be provided on the thermosensitive recording layer (IIb) of the thermosensitive recording sheet to protect the thermosensitive recording layer (IIb). In addition, various known techniques in the field of producing thermosensitive recording sheet, such as application of an adhesive treatment to the back side of thermosensitive recording sheet to convert the thermosensitive recording sheet into an adhesive label, etc. may be optionally used, if desired.

Coating Layer for Laser Printing (IIc)

(a) Coating Composition for Laser Printing

A coating composition basically comprising from 80 to 40 wt % acrylurethane resin and from 20 to 60 wt % filler can be used for forming the coating layer for laser printing on the surface layer (B) of the support (I).

An example of the coating layer for laser printing comprises a matrix consisting of an acrylic acid or methacrylic acid (hereinafter referred to simply as "(meth)acrylic acid") ester polymer crosslinked with urethane bonds and a filler dispersed in the matrix.

Acrylurethane Resin

The above-mentioned acrylurethane resin is described, e.g., in JP-B-53-32386 and JP-B-52-73985.

Such an acrylurethane resin is generally obtained by reacting a urethane prepolymer obtained from a polyisocyanate and a polyhydric alcohol with a hydroxy mono(meth)acrylate. Polymerizing the ethylenic bonds of the acrylurethane resin provides a (meth)acrylic ester polymer crosslinked with urethane bonds.

The above (meth)acrylic ester polymer is a homopolymer or copolymer of a (meth)acrylic ester in which the alcohol moiety has at least one (preferably one) hydroxy group.

The polymer containing hydroxyl groups has a hydroxyl value of from 20 to 200, preferably from 60 to 130. Hydroxyl value as used herein means the number of milligrams of potassium hydroxide necessary to neutralize the acetic acid bonded to hydroxyl groups in the acetylation of 1 g of a sample.

The (meth)acrylic ester which provides such a polymer is a monoester of an alcohol compound having at least two (preferably two) hydroxyl groups. The term "alcohol compound" as used herein includes not only typical alkanols but polyoxyalkylene glycols (the alkylene has about 2 or 3 carbon atoms). Examples of such (meth)acrylic esters include 2-hydroxyethyl (meth)acrylate, 2-hydroxypropyl (meth)acrylate, di- or polyethylene glycol mono(meth)acrylate and glycerol mono(meth)acrylate.

From the standpoint of a balance among the hardness, toughness and elasticity of the cured coating composition, the (meth)acrylic ester polymer is preferably a copolymer. Various monomers copolymerizable with the (meth)acrylic esters may be suitably used according to the intended application. Examples of useful comonomers include methylcyclohexyl (meth)acrylate, styrene, vinyltoluene and vinyl acetate. Besides the copolymerization of a hydroxylated (meth)acrylic ester, the desired copolymer can also be produced from a polymer having groups capable of changing into hydroxyl groups by treating the polymer to convert those groups into hydroxyl groups. It is convenient to employ solution polymerization.

Examples of the polyisocyanate used for forming urethane bond units include 2,6-tolylene diisocyanate, 2,4-tolylene diisocyanate, xylylene diisocyanate, diphenylmethane diisocyanate, 1,6-hexamethylene diisocyanate, and compounds obtained from derivatives of these and containing at least two isocyanate groups per molecule.

The acrylurethane resin which constitutes such a (meth)acrylic ester polymer matrix crosslinked with urethane bonds may be partly replaced with a vinyl chloride-vinyl acetate copolymer.

Filler

A filler employed in conventional coating compositions can be incorporated in the coating composition for laser printing. Examples thereof include heavy calcium carbonate, calcined clay, titanium oxide, barium sulfate and diatomaceous earth.

Formation of Recording Layer

The coating composition is applied on the surface layer (B) of the support (I) at a spread rate of generally from 0.5 to 20 g/m$^2$, preferably from 2 to 8 g/m$^2$, on a solid basis to form a recording layer (II) for laser printing on which a printed image can be formed with a laser printer.

Thermal Transfer Image-receiving Layer (IId)

The thermal transfer image-receiving layer (IId) is an image-receiving layer which, when superposed on a thermal transfer sheet and heated together with the same, is capable of receiving an ink transferred from the thermal transfer sheet to form an image.

This image-receiving layer is formed by applying a coating composition for image-receiving layer formation and drying the coating to remove the solvent.

Examples of resins usable as a component of the coating composition for image-receiving layer formation include oligo ester acrylate resins, saturated polyester resins, vinyl chloride-vinyl acetate copolymers, acrylic ester-styrene copolymers and epoxy acrylate resins. A solution of any of these resins in toluene, xylene, methyl ethyl ketone, cyclohexanone, or another solvent is used as a coating composition.

An ultraviolet absorber and/or a light stabilizer can be incorporated into the coating composition in order to enhance light resistance.

Examples of the ultraviolet absorber include 2-(2'-hydroxy-3,3'-di-t-butylphenyl)-5-chlorobenzotriazole, 2-(2-hydroxy-3,5-t-amylphenyl)-2H-benzotriazole, 2-(2'-hydroxy-3'-t-butyl-5'-methylphenyl)-5-chlorobenzotriazole, 2-(2'-hydroxy-3',5'-t-butylphenyl)benzotriazole and 2-(2'-hydroxy-3',5'-di-t-amylphenyl)benzotriazole.

Examples of the light stabilizer include distearylpentaerythritol diphosphite, bis(2,4-di-t-butylphenyl) pentaerythritol diphosphite, dinonylphenylpentaerythritol diphosphite, cyclic neopentanetetrayl bis(octadecylphosphite), tris(nonylphenyl) phosphite and 1-[2-[3-(3,5-di-t-butyl-4-hydroxyphenyl)propionyloxy]-2,2,6,6-tetramethylpiperidine.

The addition amount of the ultraviolet absorber and the light stabilizer each is from 0.05 to 10 parts by weight, preferably from 0.5 to 3 parts by weight, per 100 parts by weight of the resin contained in the image-receiving layer.

A release agent can be incorporated into the image-receiving layer to improve releasability from the thermal transfer sheet after heating thereon. Examples of the release agent include solid waxes such as polyethylene wax, amide wax, and poly(tetrafluoroethylene) powder, surfactants and phosphoric esters, and silicone oils. Preferred among these are silicone oils. Although oily silicone oils can be used, curable silicone oils are preferred.

A white pigment can also be incorporated into the image-receiving layer for improving the whiteness of the image-receiving layer to enhance the clarity of transferred images, adopting the surface of the thermal transfer image-receiving layer for writing with a pencil, and preventing re-transfer of transferred images. Examples of the white pigment include titanium oxide, zinc oxide, kaolin and clay. A mixture of two or more of these can also be used.

The titanium oxide may be anatase titanium oxide or rutile titanium oxide. Examples of the anatase titanium oxide include KA-10, KA-20, KA-15, KA-30, KA-35, KA-60, KA-80 and KA-90 (trade names; all manufactured by Titan Kogyo K.K., Japan). Examples of rutile titanium oxide include KR-310, KR-380, KR-460 and KR-480 (trade names; all manufactured by Titan Kogyo K.K.). The addition amount of the white pigment is from 5 to 90 parts by weight, preferably from 30 to 80 parts by weight, per 100 parts by weight of the resin contained in the image-receiving layer.

The thickness of the thermal transfer image-receiving layer is generally from 0.2 to 20 µm, preferably from 3 to 15 µm.

Various kinds of thermal transfer sheets (ink ribbons) can be used for transferring an ink to the thermal transfer image-receiving layer to form an image. An example of the thermal transfer sheets comprises a base layer consisting of, e.g., a polyester film, and formed thereon a layer of a composition which comprises a binder and a colorant as major components and which optionally contains additive ingredients such as a softener, a plasticizer, a melting point regulator, a leveling agent and a dispersant.

Examples of the above major components are as follows. Useful binders include known waxes such as paraffin wax, carnauba wax, and ester wax and various polymers having a low melting point, e.g., polyesters, polyamides. Useful colorants include carbon black and various organic and inorganic pigments or dyes. Sublimable inks may also be used.

The thermal transfer image-receiving sheet of the present invention can be formed by providing a thermal transfer image-receiving layer (IId) on the surface of the support (I).

The present invention will be explained below in more detail by reference to the following Examples. However, the present invention should not be construed as being limited thereto.

Production of Stretched Resin Films

PRODUCTION EXAMPLE 1

(1) A composition (a) consisting of 81 wt % polypropylene having a melt flow rate (MFR) of 0.8 g/10 min and a melting point of about 164 to 167° C., 3 wt % high-density polyethylene, and 16 wt % calcium carbonate having an average particle diameter of 1.5 µm was kneaded in an extruder set at 270° C., extruded into sheeting, and then cooled in a cooling machine to obtain an unstretched film.

This film was reheated to 150° C. and stretched in the machine direction 5 times to obtain a stretched film having a machine-direction stretch ratio of 5.

(2) A composition (b) consisting of 54 wt % polypropylene having an MFR of 4 g/10 min and a melting point of about 164 to 167° C. and 46 wt % calcium carbonate having an average particle diameter of 1.5 µm was kneaded in another extruder at 210° C., extruded into sheeting with a die, and laminated to both sides of the stretched film obtained in step (1) above which had a machine-direction stretch ratio of 5. The resulting three-layered laminate film was cooled to 60° C. and then reheated to about 155° C., at which temperature it was stretched in the transverse direction 7.5 times with a tenter. After the stretched laminate film was annealed at 165° C., it was cooled to 60° C. and trimmed. Thus, a stretched resin film was obtained which was a three-layered laminate (uniaxially stretched film/biaxially stretched film/uniaxially stretched film) having a total thickness of 80 µm (b/a/b=10 µm/60 µm/10 µm) and having an opacity of 87%, a void volume of 31%, a density of 0.79 g/cm$^3$ and a Clark stiffnesses (S values) of 13 and 23 in the machine and transverse directions, respectively.

PRODUCTION EXAMPLE 2

(1) A composition (a) consisting of 81 wt % polypropylene having a melt flow rate (MFR) of 0.8 g/10 min and a melting point of about 164 to 167° C., 3 wt % high-density polyethylene, and 16 wt % calcium carbonate having an average particle diameter of 1.5 μm was kneaded in an extruder set at 270° C., extruded into sheeting, and then cooled in a cooling machine to obtain an unstretched film. This film was reheated to 140° C. and stretched in the machine direction 5 times to obtain a stretched film having a machine-direction stretch ratio of 5.

(2) A composition (b) consisting of 54 wt % polypropylene having an MFR of 4.0 g/10 min and a melting point of about 164 to 167° C. and 46 wt % calcium carbonate having an average particle diameter of 1.5 μm was kneaded in another extruder, extruded into sheeting with a die, and laminated to both sides of the stretched film obtained in step (1) above which had a machine-direction stretch ratio of 5.

The resulting three-layered laminate film was cooled to 60° C. and then reheated to about 160° C., at which temperature it was stretched in the transverse direction 7.5 times with a tenter. After the stretched laminate film was annealed at 165° C., it was cooled to 60° C. and trimmed. Thus, a stretched resin film was obtained which was a three-layered laminate (uniaxially stretched film/biaxially stretched film/uniaxially stretched film) having a total thickness of 130 μm (b/a/b=30 μm/70 μm/30 μm) and having a density of 0.77 g/cm³, an opacity of 95%, a burst strength of 8 kg/cm², a Clark stiffness (machine direction) of 51 and a Clark stiffness (transverse direction) of 108. The void volumes of the individual layers were (b/a/b=30%/33.7%/30%).

PRODUCTION EXAMPLE 3

(1) A composition consisting of 55 wt % polypropylene having a melt flow rate (MFR) of 4.0 g/10 min and a melting point of about 164 to 167° C., 25 wt % high-density polyethylene, and 20 wt % calcium carbonate having an average particle diameter of 1.5 μm was kneaded in an extruder set at 270° C., extruded into sheeting, and then cooled in a cooling machine to obtain an unstretched film.

(2) This film was reheated to 150° C. and stretched in the machine direction 5 times to obtain a stretched film having a machine-direction stretch ratio of 5.

Subsequently, the stretched film was reheated to 155° C., at which temperature it was stretched in the transverse direction 7.5 times with a tenter. After this film was annealed at 165° C., it was cooled to 60° C. and trimmed. Thus, a microporous stretched resin film was obtained which was a biaxially stretched film having a density of 0.88 g/cm³, an opacity of 86%, a Clark stiffnesses of 8 (machine direction) and 9 (transverse direction), a thickness of 45 μm and a void volume of 37%.

PRODUCTION EXAMPLE 4

(1) A composition (a) consisting of 81 wt % polypropylene having a melt flow rate (MFR) of 1.0 g/10 min and a melting point of about 164 to 167° C., 3 wt % high-density polyethylene, and 16 wt % calcium carbonate having an average particle diameter of 1.5 μm was kneaded in an extruder set at 270° C., extruded into sheeting, and then cooled in a cooling machine to obtain an unstretched film.

This film was reheated to 150° C. and stretched in the machine direction 5.5 times to obtain a stretched film having a machine-direction stretch ratio of 5.5.

(2) A composition (b) consisting of 54 wt % polypropylene having an MFR of 4.2 g/10 min and a melting point of about 164 to 167° C. and 46 wt % calcium carbonate having an average particle diameter of 1.5 μm was kneaded in another extruder at 210° C., extruded into sheeting with a die, and laminated to both sides of the stretched film obtained in step (1) above which had a machine-direction stretch ratio of 5.5. The resulting three-layered laminate film was cooled to 60° C. and then reheated to about 155° C., at, which temperature it was stretched in the transverse direction 7.5 times with a tenter. After the stretched laminate film was annealed at 165° C., it was cooled to 60° C. and trimmed. Thus, a stretched resin film was obtained which was a three-layered laminate (uniaxially stretched film/biaxially stretched film/uniaxially stretched film) having a total thickness of 110 μm (b/a/b=25 μm/60 μm/25 μm) and having an opacity of 94.2%, a void volume of 32%, a density of 0.79 g/cm³ and a Clark stiffnesses (S values) of 29.7 and 71.9 in the machine and transverse directions, respectively.

The front and back sides of each of the microporous stretched films obtained in Production Examples 1 to 4 were subjected to corona discharge treatment. Each of these films was then coated on both sides with a coating composition in an amount of 0.05 g/m² for each side on a solid basis, and wound up after drying. The coating composition used was an aqueous solution of the following ingredients.

| | |
|---|---|
| (a) Aqueous solution of an antistatic polyacrylic resin "ST-1100" manufactured by Mitsubishi Chemical Corp., Japan | 100 parts by weight |
| (b) Water-soluble epichlorohydrin adduct of polyamine polyamide ("KYMENE 557H" manufactured by Dick-Hercules Chemicals, Inc., Japan) | 25 parts by weight |

Nonwoven Fabric Sheets

PRODUCTION EXAMPLE 5

The properties of nonwoven fabric sheet "SPUN BOND #UNISEL" (trade name), manufactured by Teijin Ltd., are shown in Table 1.

PRODUCTION EXAMPLE 6

The properties of nonwoven fabric synthetic paper "TYVEK" (trade name), manufactured by E.I. du Pont de Nemours & Co., Inc., are shown in Table 1.

Support

PRODUCTION EXAMPLE 7

The multilayered stretched resin film obtained in Production Example 4 was coated on one side with an adhesive consisting of 85 parts by weight of a mixture of polyurethane anchor coating agents "BLS-2080A" and "BLS-2080B", manufactured by Toyo Morton K.K., and 15 parts by weight of titanium oxide in an amount of 4 g/m² (on a solid basis). Subsequently, a nonwoven fabric sheet "SPUN BOND #UNISEL", manufactured by Teijin Ltd., was bonded thereto by means of pressure rolls to obtain a support composed of a nonwoven fabric sheet/opacifying layer/stretched resin film. The properties of this support are shown in Table 1.

TABLE 1

| | Multilayered stretched resin film Production Example 4 | Nonwoven fabric sheet SPUN BOND UNISEL, Production Example 5 | Nonwoven fabric sheet TYVEK (Du Pont), Production Example 6 | Support Production Example 7 Production Example 4/ SPUN BOND |
|---|---|---|---|---|
| Thickness ($\mu$m) | 109 | 57 | 195 | 162 |
| Basis weight (g/m$^2$) | 86.2 | 15.5 | 98.2 | 112 |
| Density (g/cm$^3$) | 0.79 | 0.27 | 0.50 | 0.70 |
| Thickness unevenness ($\mu$m) | 4 | 38 | 88 | 26 |
| Whiteness (%) | 95.9 | 92.8 | 96.7 | 96.1 |
| Opacity (%) | 94.2 | 20.9 | 96.5 | 100 |
| Gloss (front/back) (%) | 18.2/18.2 | 8.3/8.1 | 7.9/5.2 | 17.2/9.7 |
| Surface smoothness (front/back) (sec) | 450/580 | 5/5 | 15/10 | 620/5 |
| Clark stiffness (MD/TD) (S) | 29.7/71.9 | — | 53.4/66.4 | 34.3/70.2 |
| Taber stiffness (MD/TD) (g · cm) | 1.1/2.2 | — | 3.4/3.1 | 1.7/2.1 |
| Surface resistivity (front/back) ($\Omega$) | $4.1 \times 10^{10}$/ $5.8 \times 10^{10}$ | $1.6 \times 10^{16}$/ $8.3 \times 10^{15}$ | $2.4 \times 10^{16}$/ $7.2 \times 10^{11}$ | $9.0 \times 10^{10}$/ $2.3 \times 10^{15}$ |
| Electrostatic decay (front/back) (sec) | 0.9/0.7 | 28/52 | 2.0/2.2 | 1.1/ |
| Tensile strength (MD/TD) (kg/15 mm) | 8.6/21.7 | 0.6/0.7 | 16.5/19.3 | 10.4/27.5 |
| Tensile strength (MD/TD) (kg/cm$^2$) | 518/1329 | 70/73 | 527/620 | 420/1100 |
| Elongation (MD/TD) (%) | 123/18.2 | 88/53 | 19.4/22.5 | 121/25.2 |
| Tear strength (MD/TD) (g) | 44/23 | 60/50 | 376/333 | 155/78 |
| Tear strength (perpendicular) (g) | 194/318 | — | 2535/2400 | 452/448 |

EXAMPLE 1

A coating composition for ink-receiving layer formation prepared according to the following formulation was applied to the stretched resin film of the support obtained in Production Example 7, in an amount of 30 g/m$^2$ on a solid basis. After the coating was dried, the coated support was subjected to a smoothing treatment with a supercalender to obtain an ink-jet recording sheet.

Formulation for Coating Composition

| | |
|---|---|
| Synthetic silica powder | 100 parts by weight |
| Poly(vinyl alcohol) | 30 parts by weight |
| Quaternary ammonium salt of polyethyleneimine | 10 parts by weight |
| Poly(sodium acrylate) | 5 parts by weight |
| Water | 1,600 parts by weight |

Comparative Example 1

An ink-jet recording sheet (opacity, 100%) was obtained in the same manner as in Example 1, except that the synthetic paper obtained in Production Example 2 was used alone as a support.

EXAMPLE 2

The back side of the synthetic paper obtained in Production Example 3 was subjected to black solid offset printing to form an opacifying layer (thickness, 2 $\mu$m) having a color density of 1.65. This synthetic paper was bonded to a fiber-reinforced sheet "TYVEK", manufactured by E.I. du Pont de Nemours & Co., Inc., with a polyurethane anchor coating agent (2 g/m$^2$) to obtain a support composed of nonwoven fabric sheet/adhesive/solid print/synthetic paper and having a thickness of 245 $\mu$m.

A coating composition prepared according to the following formulation was applied to the synthetic paper of the support in an amount of 20 g/m$^2$. After the coating was dried, the coated support was subjected to a smoothing treatment with a supercalender to obtain an ink-jet recording sheet.

Formulation for Coating Composition

| | |
|---|---|
| Synthetic silica | 80 parts by weight |
| Calcined clay | 20 parts by weight |
| Poly(vinyl alcohol) (PVA-105, manufactured by Kuraray Co., Ltd., Japan) | 10 parts by weight |
| Epichlorohydrin adduct of polyamide polyamine | 5 parts by weight |
| Ethylene-vinyl acetate copolymer emulsion (solid content, 40 wt %) | 100 parts by weight |
| Acrylic copolymer emulsion containing quaternary ammonium salt (solid content, 25 wt %) | 40 parts by weight |

Water was added to dilute a mixture of the above ingredients to a solid concentration of 12 wt %.

EXAMPLE 3

An ink-jet recording sheet was obtained in the same manner as in Example 1, except that a nonwoven fabric sheet UNISEL BT-08U7W (trade name; basis weight, 40 g/m$^2$; thickness, 0.15 mm), manufactured by Teijin Ltd., was used in place of the nonwoven fabric sheet employed in Example 1.

Evaluation

Using an ink-jet printer manufactured by Canon Inc., Japan, the ink-receiving layer of each ink-jet recording sheet was printed in four colors, i.e., yellow, magenta, cyan, and black. The time required for the inks to dry was measured.

Subsequently, all the colors on each recording sheet were ascertained to have a sufficient density. Ink adhesion was then examined by firmly applying adhesive tape "CELLO-TAPE" (trade name), manufactured by Nichiban Co., Ltd., Japan, to part of the printed surface of each recording sheet, rapidly stripping the tape along the adhered surface, and visually judging the ink retention on the recording sheet.

| Ink retention: | 100 to 95% | good (o) |
|---|---|---|
|  | 95 to 80% | medium (Δ) |
|  | 80 to 0% | poor (x) |

On the other hand, each printed recording sheet was immersed in running water for 5 minutes and then dried. Thereafter, the recording sheet was examined for image retention and rumpling. As a result, each recording sheet had a satisfactory image retention and no rumples.

A V-notch was formed with a knife on an edge of each printed recording sheet, and the notched sheet was lightly stretched by both hands to examine whether the sheet suffered tearing.

Furthermore, a printed recording sheet (length, 2,000 mm; width, 1,000 mm) was wound into a roll, and the roll was stored for one week in a 23° C. thermostatic room having a relative humidity of 55%. Thereafter, the recording sheet was unwound, placed on a flat plate, and then examined for curling.

The results obtained are shown in Table 2.

TABLE 2

|  | Drying time | Ink retention | Ink retention after immersion in water | Rumpling | Tearing | Curling |
|---|---|---|---|---|---|---|
| Example 1 | 34 sec | o | o | none | none | none |
| Comparative Example 1 | 60 sec | o | o | none | occurred | occurred |
| Example 2 | 42 sec | o | o | none | none | none |
| Example 3 | 38 sec | o | o | none | none | none |

EXAMPLE 4

The multilayered stretched resin film obtained in Production Example 1 was coated on one side with an adhesive consisting of 85 parts by weight of a mixture of polyurethane anchor coating agents "BLS-2080A" and "BLS-2080B", manufactured by Toyo Morton K.K., and 15 parts by weight of titanium oxide in an amount of 4 g/m² (on a solid basis). Subsequently, plain weave fabric "PONGEE #6575", manufactured by Toray Industries, Inc., Japan, was bonded thereto by means of pressure rolls to obtain a support composed of plain weave fabric/opacifying layer/stretched resin film. This support had a thickness of 126 μm and an opacity of 100%.

A coating composition for forming an ink-receiving layer and prepared according to the following formulation was applied to the stretched resin film of the support in an amount of 30 g/m² on a solid basis. After the coating was dried, the coated support was subjected to a smoothing treatment with a supercalender to obtain an ink-jet recording sheet.

Formulation for Coating Composition

| Synthetic silica powder | 100 parts by weight |
|---|---|
| Poly(vinyl alcohol) | 30 parts by weight |
| Quaternary ammonium salt of polyethyleneimine | 10 parts by weight |
| Poly(sodium acrylate) | 5 parts by weight |
| Water | 1,600 parts by weight |

COMPARATIVE EXAMPLE 2

An ink-jet recording sheet was obtained in the same manner as in Example 4, except that the synthetic paper obtained in Production Example 2 was used alone as a support.

EXAMPLE 5

The back side of the synthetic paper obtained in Production Example 3 was subjected to black solid offset printing to form a solid printing layer (thickness, 2 μm) having a color density of 1.65. This synthetic paper was bonded to the same plain weave fabric as in Example 4 with a polyurethane anchor coating agent (2 g/m²) to obtain a support composed of plain weave fabric/adhesive/solid print/synthetic paper and having a thickness of 96 μm.

A coating composition prepared according to the following formulation was applied to the synthetic paper of the support in an amount of 20 g/m². After the coating was dried, the coated support was subjected to a smoothing treatment with a supercalender to obtain an ink-jet recording sheet.

Formulation for Coating Composition

| Synthetic silica | 80 parts by weight |
|---|---|
| Calcined clay | 20 parts by weight |
| Poly(vinyl alcohol) (PVA-105, manufactured by Kuraray Co., Ltd., Japan) | 10 parts by weight |
| Epichlorohydrin adduct of polyamide polyamine | 5 parts by weight |
| Ethylene-vinyl acetate copolymer emulsion (solid content, 40 wt %) | 100 parts by weight |
| Acrylic copolymer emulsion containing quaternary ammonium salt (solid content, 25 wt %) | 40 parts by weight |

Water was added to dilute a mixture of the above ingredients to a solid concentration of 12 wt %.

Evaluation

Using an ink-jet printer manufactured by Canon Inc., the ink-receiving layer of each ink-jet recording sheet was printed in four colors, i.e., yellow, magenta, cyan, and black. The time required for the inks to dry was measured.

Subsequently, all the colors on each recording sheet were ascertained to have a sufficient density. Ink adhesion was then examined by firmly applying adhesive tape "CELLO-TAPE" (trade name), manufactured by Nichiban Co., Ltd., to part of the printed surface of each recording sheet, rapidly stripping the tape along the adhered surface, and visually judging the ink retention on the sheet.

| Ink retention: | 100 to 95% | good (o) |
|---|---|---|
|  | 95 to 80% | medium (Δ) |
|  | 80 to 0% | poor (x) |

On the other hand, each printed recording sheet was immersed in running water for 5 minutes and then dried.

Thereafter, the recording sheet was examined for image retention and rumpling. As a result, each recording sheet had a satisfactory image retention and no rumples.

A V-notch was formed with a knife on an edge of each printed recording sheet, and the notched sheet was lightly stretched by both hands to examine whether the sheet suffered tearing. The results obtained are shown in Table 3.

TABLE 3

| | Drying time | Ink retention | Ink retention after immersion in water | Rumpling | Tearing |
|---|---|---|---|---|---|
| Example 4 | 32 sec | ○ | ○ | none | none |
| Comparative Example 2 | 60 sec | ○ | ○ | none | occurred |
| Example 5 | 28 sec | ○ | ○ | none | none |

EXAMPLE 6

The multilayered stretched resin film obtained in Production Example 1 was coated on one side with an adhesive consisting of 85 parts by weight of a mixture of polyurethane anchor coating agents "BLS-2080A" and "BLS-2080B", manufactured by Toyo Morton K.K., and 15 parts by weight of titanium oxide in an amount of 4 g/m² (on a solid basis). Subsequently, plain weave fabric "PONGEE #6575", manufactured by Toray Industries, Inc., was bonded thereto by means of pressure rolls to obtain a support composed of plain weave fabric/opacifying layer/stretched resin film. This support had a thickness of 126 μm and an opacity of 100%.

A coating composition for thermosensitive recording prepared by the following preparation method was applied to the stretched resin film of the support by the coating method shown below. After the coating was dried, the coated support was subjected to a smoothing treatment with a supercalender to obtain a thermosensitive recording sheet.

Preparation Method for Coating Composition for Thermosensitive Recording

| (1) Preparation of Liquid A | |
|---|---|
| 3-(N-Ethyl-N-isoamylamino)-6-methyl-7-phenylaminofluoran | 10 parts by weight |
| Dibenzyl terephthalate | 20 parts by weight |
| Methyl cellulose, 5% aqueous solution | 20 parts by weight |
| Water | 40 parts by weight |

The above ingredients were mixed, and the mixture was treated with a sand mill to pulverize the particles to an average particle diameter of 3 μm.

(2) Preparation of Liquid B

| 4,4'-Isopropylidenediphenol | 30 parts by weight |
|---|---|
| Methyl cellulose, 5% aqueous solution | 40 parts by weight |
| Water | 20 parts by weight |

The above ingredients were mixed, and the mixture was treated with a sand mill to pulverize the particles to an average particle diameter of 3 μm.

(3) Preparation of Coating Composition

A coating composition was prepared by mixing 90 parts by weight of liquid A, 90 parts by weight of liquid B, 30 parts by weight of a silicon oxide pigment (trade name, MIZUCASIL P-527; average particle diameter, 1.8 μm; oil absorption, 180 cc/100 g; manufactured by Mizusawa Industrial Chemicals, Ltd., Japan), 300 parts by weight of a 10% aqueous solution of poly(vinyl alcohol) and 28 parts by weight of water, and stirring the mixture.

Coating Method

A water-based coating fluid comprising a mixture of a polyethylenimine anchor coating agent and silica for antiblocking was applied to form an anchor coating layer. Next, the coating composition for thermosensitive recording prepared by the above method was applied in an amount of 5 g/m² on a dry basis and then dried. The thus-coated support was supercalendered to obtain a thermosensitive recording sheet.

The thermosensitive recording sheet was printed using a printer manufactured by Ohkura Electric Co., Ltd., Japan (dot density, 8 dots/mm, printing power, 0.19 W/dot) while varying the printing pulse width. The gradation of the resulting image was visually judged.

⊚: excellent

○: good

Δ: unsuitable for practical use

×: poor

The resulting print was placed on a horizontal plate to measure the height of curling.

Subsequently, ink adhesion was evaluated by firmly applying adhesive tape "CELLOTAPE" (registered trademark), manufactured by Nichiban Co., Ltd., to part of the printed surface of each recording sheet, rapidly stripping the tape along the adhered surface, and visually judging ink retention on the sheet.

| Ink retention: | 100 to 95% | good (○) |
|---|---|---|
| | 95 to 80% | medium (Δ) |
| | 80 to 0% | poor (×) |

On the other hand, each printed recording sheet was immersed in running water for 5 minutes and then dried. Thereafter, the recording sheet was examined for image retention and rumpling. As a result, each recording sheet had a satisfactory image retention and no rumples.

A V-notch was formed with a knife on an edge of each printed recording sheet, and the notched sheet was lightly stretched by both hands to examine whether the sheet suffered tearing.

The results of the above evaluations are shown in Table 4.

Comparative Example 3

A thermosensitive recording sheet was obtained in the same manner as in Example 6, except that the synthetic paper obtained in Production Example 2 was used alone as a support. The results obtained are shown in Table 4.

EXAMPLE 7

The back side of the synthetic paper obtained in Production Example 3,was subjected to black solid offset printing to form a solid printing layer (thickness, 2 μm) having a color density of 1.65. This synthetic paper was bonded to the same plain weave fabric as in Example 6 with a polyurethane anchor coating agent (2 g/m²) to obtain a support composed of plain weave fabric/adhesive/solid print/ synthetic paper and having a thickness of 96 μm. The results obtained are shown in Table 4.

TABLE 4

|  | Ink retention | Ink retention after immersion in water | Rump- ling | Tearing | Height of thermal curling (mm) |
|---|---|---|---|---|---|
| Example 6 | ○ | ○ | none | none | 1–2 |
| Comparative Example 3 | ○ | ○ | none | occurred | 3–5 |
| Example 7 | ○ | ○ | none | none | 1–2 |

Examples 8 and 9 and Comparative Example 4

Recording sheets were obtained in the same manner as in Example 6, except that the supports (I) obtained in Examples 6 and 7 and Comparative Example 3 were used, and that the following coating composition for forming a thermal transfer image-receiving layer was applied to the synthetic paper of each support.

Preparation of Coating Composition for forming a Thermal Transfer Image-receiving Layer

| VYLON 200 (saturated polyester manufactured by Toyobo Co., Ltd., Japan; Tg = 67° C.) | 5.3 parts by weight |
|---|---|
| VYLON 290 (saturated polyester manufactured by Toyobo Co., Ltd.; Tg = 77° C.) | 5.3 parts by weight |
| VINYLITE VYHH (vinyl chloride copolymer manufactured by Union Carbide Corp.) | 4.5 parts by weight |
| Titanium oxide (KA-10, manufactured by Titan Kogyo K.K.) | 1.5 part by weight |
| KF-393 (amino-modified silicone oil manufactured by Shin-Etsu Silicone Co., Ltd., Japan) | 1.1 part by weight |
| X-22-343 (epoxy-modified silicone oil manufactured by Shin-Etsu Silicone Co., Ltd.) | 1.1 part by weight |
| Toluene | 30 parts by weight |
| Methyl ethyl ketone | 30 parts by weight |
| Cyclohexanone | 22 parts by weight |

The above ingredients were mixed to prepare a composition for forming an image-recording/receiving layer. This composition was applied with a wire bar at a thickness of 4 μm on a dry basis and dried. Thus, image-receiving sheets for thermal transfer recording were obtained.

Each of the image-receiving sheets for thermal transfer recording was printed using a printer manufactured by Ohkura Electric Co., Ltd. (dot density, 6 dots/mm, printing power, 0.23 W/dot) while varying the printing pulse width. The gradation of the resulting image was visually judged.

⊙: excellent

○: good

Δ: unsuitable for practical use

×: poor

The image-receiving sheets were further evaluated for water-proofness, tear resistance, and curling height in the same manner as in Example 6. The results obtained are shown in Table 5.

TABLE 5

|  | Ink retention | Ink retention after immersion in water | Rump- ling | Tearing | Height of thermal curling (mm) |
|---|---|---|---|---|---|
| Example 8 | ○ | ○ | none | none | 1–2 |
| Example 9 | ○ | ○ | none | none | 1–2 |
| Comparative Example 4 | ○ | ○ | none | occurred | 3–4 |

Examples 10 and 11 and Comparative Example 5

Recording sheets for non-impact printers were obtained in the same manner as in Example 6, except that the supports obtained in Examples 6 and 7 and Comparative Example 3 were used, and the following coating composition for laser print formation was applied to the synthetic paper of each support.

Preparation of Coating Composition for Laser Print Formation

Into a three-necked flask equipped with a stirrer, reflux condenser and thermometer were introduced 15 parts by weight of 2-hydroxyethyl methacrylate, 50 parts by weight of methyl methacrylate, 35 parts by weight of ethyl acrylate and 100 parts by weight of toluene. After the atmosphere in the flask was replaced with nitrogen, 0.6 part by weight of 2,2'-azobisisobutyronitrile was introduced as an initiator to conduct polymerization at 80° C. for 4 hours.

The resulting solution was a 50% toluene solution of a hydroxylated methacrylate polymer having a hydroxyl value of 65.

Subsequently, 80 parts by weight of the solution was mixed with 34 parts by weight of a 75% ethyl acetate solution of "CORONATE HL" (hexamethylene isocyanate manufactured by Nippon Polyurethane Co., Ltd., Japan) and 35 parts by weight of a heavy calcium carbonate powder having an average particle diameter of 1.5 μm. This mixture was diluted with butyl acetate to a solid content of 40% by weight. The thus-prepared coating composition was applied to the synthetic paper of each of the supports in an amount of 8 g/m² on a dry basis, and the coating was cured at 80° C. for 1 hour. Thus, recording sheets for non-impact printers were obtained.

Each of the recording sheets for non-impact printers was printed with a toner using a dry non-impact printer SP8-X (trade name), manufactured by Showa Joho Kiki K.K., Japan, and the resulting print was evaluated for readability.

⊙: excellent

○: good

Δ: unsuitable for practical use

×: poor

The recording sheets were further subjected to an image water-proofness test and a tear resistance test in the same manner as in Example 6. The results obtained are shown in Table 6.

TABLE 6

|  | Ink retention | Ink retention after immersion in water | Rump- ling | Tearing | Height of thermal curling (mm) |
|---|---|---|---|---|---|
| Example 10 | ○ | ○ | none | none | 0–1 |
| Example 11 | ○ | ○ | none | none | 0–1 |

TABLE 6-continued

|  | Ink retention | Ink retention after immersion in water | Rumpling | Tearing | Height of thermal curling (mm) |
|---|---|---|---|---|---|
| Comparative Example 5 | ○ | ○ | none | occurred | 2–3 |

Examples 12 to 14

A thermosensitive recording sheet, a thermal transfer image-receiving sheet, and a recording sheet for non-impact printers were obtained in the same manner as in Examples 6, 8, and 10, respectively, except that a support having the following structure was used.

Structure of the Support

Plain weave fabric "PONGEE #6575", manufactured by Toray Industries, Inc., was coated on both sides with an adhesive consisting of 85 parts by weight of a mixture of polyurethane anchor coating agents "BLS-2080A" and "BLS-2080B", manufactured by Toyo Morton K.K., and 15 parts by weight of titanium oxide in an amount of 4 g/m² for each side (on a dry basis). Subsequently, the multilayered stretched resin film obtained in Production Example 1 was bonded thereto by means of pressure rolls to obtain a support composed of stretched resin film/adhesive/plain weave fabric/opacifying layer/stretched resin film. This support had a thickness of 210 μm and an opacity of 100%.

The results of capacity evaluations of these recording sheets are shown in Table 7.

TABLE 7

|  | Ink retention | Ink retention after immersion in water | Rumpling | Tearing | Height of thermal curling (mm) |
|---|---|---|---|---|---|
| Example 12 | ○ | ○ | none | none | 0 |
| Example 13 | ○ | ○ | none | none | 0 |
| Example 14 | ○ | ○ | none | none | 0 |

The recording sheets of the present invention have a tough surface, and exhibit excellent ink absorption, high-speed printability and clarity of developed color. Furthermore, the recording sheets of the present invention are water-proof, provide a water-proof image and have excellent tear resistance.

The recording sheet of the present invention for ink-jet recording has a further advantage in that it is free from the problem of print curling even when printed with a water-based ink. Therefore, when the print is stored in a rolled state and then unwound so as to tack it on a wall or use it as a flag fastened on a pole, the print can be immediately tacked or fastened without the necessity of conducting a curl-reducing operation as required by prior art recording sheets.

While the invention has been described in detail and with reference to specific embodiments thereof, it will be apparent to one skilled in the art that various changes and modifications can be made therein without departing from the spirit and scope thereof.

What is claimed is:

1. A recording sheet which comprises a support (I) having formed on a surface thereof an image-recording/receiving layer (II) selected from an ink-receiving layer (IIa) for receiving an ink-jet printing ink, a thermosensitive recording layer (IIb), a coating layer (IIc) for laser printing and a thermal transfer image-receiving layer (IId), said support (I) is a support (Ia) having a laminated structure comprising a woven fabric (A) having a basis weight of from 50 to 200 g/m² which is a plain weave fabric woven of warp threads of 40 to 150 denier at 50 to 140 ends per inch (2.54 cm) and weft threads of 40 to 150 denier at 50 to 140 picks per inch and interlaced for every thread and, bonded thereto on one or both sides with an adhesive, a water-proof stretched resin film (B) having a machine-direction Clark stiffness (S value) of from 8 to 300, a transverse-direction Clark stiffness of from 8 to 300 and a thickness of from 20 to 300 μm, said image-recording/receiving layer (II) being provided on the support (I) on the side where the stretched resin layer (B) is present.

2. The recording sheet as claimed in claim 1, wherein the support (I) has an opacity of 100%.

3. The recording sheet for ink-jet recording as claimed in claim 1, wherein the image-recording/receiving layer (II) is an ink-receiving layer (IIa), the ink-jet printing ink is a water-based ink, and the ink-receiving layer (IIa) comprises, on a solid basis, from 50 to 88 wt % pigment, from 10 to 40 wt % water-based adhesive and from 2 to 20 wt % ink-setting agent.

4. The recording sheet for thermosensitive recording as claimed in claim 1, wherein the image-recording/receiving layer (II) is a thermosensitive recording layer (IIb) obtained by applying a coating composition containing a color former, a color developer and a binder to the support (I) on the side where the stretched resin film (B) is present, and then drying the coating.

5. The recording sheet for laser printing as claimed in claim 1, wherein the image-recording/receiving layer (II) is a coating layer (IIc) for laser printing which comprises from 40 to 80 wt % acrylurethane resin and from 60 to 20 wt % fine inorganic particles.

6. The recording sheet for thermal transfer image reception as claimed in claim 1, wherein the image-recording/receiving layer (II) is a thermal transfer image-receiving layer (IId) which comprises 100 parts by weight of a resin, from 5 to 90 parts by weight of a white pigment and from 0.05 to 10 parts by weight of an ultraviolet absorber or light stabilizer.

7. The recording sheet as claimed in claim 1, wherein the stretched resin film layer (B) is a multilayered synthetic paper comprising a base layer (B1) consisting of a biaxially stretched thermoplastic resin film containing from 0 to 30 wt % fine inorganic particles and a paper-like layer (B2) consisting of a uniaxially stretched film of a thermoplastic resin containing from 8 to 65 wt % fine inorganic particles, and the support (I) has a laminated structure in which the woven fabric (A) of the sheet constitutes a surface layer and the paper-like layer (B2) of the multilayered synthetic paper (B) constitutes the other surface layer.

8. The recording sheet as claimed in claim 1, wherein the woven fabric (A) has from 60 to 100 warp threads per inch and from 60 to 100 weft threads per inch.

9. The recording sheet as claimed in claim 1, wherein the woven fabric (A) has a basis weight of from 50 to 100 g/m².

10. The recording sheet as claimed in claim 1, wherein the material of the warp and weft threads constituting the woven fabric (A) is selected from the group consisting of nylon 6, nylon 6,6, poly(ethylene terephthalate), cotton, rayon, polyacrylonitrile, poly(fluoroethylene), polypropylene and poly(vinylidene fluoride).

11. The recording sheet as claimed in claim 1, wherein the stretched resin film (B) is a stretched film of a thermoplastic resin selected from the group consisting of polypropylene, high-density polyethylene, poly(ethylene terephthalate) and polycarbonate or a microporous synthetic paper comprising a stretched resin film having microvoids.

12. The recording sheet as claimed in claim 1, wherein the stretched resin film (B) is a microporous synthetic paper comprising a stretched resin film having microvoids and having a void volume of from 10 to 60% and a thickness of from 30 to 300 μm.

13. The recording sheet as claimed in claim 1, wherein the stretched resin film (B) is a microporous synthetic paper selected from a biaxially stretched microporous thermoplastic resin film containing 8 to 65 wt % inorganic or organic filler and a synthetic paper comprising a base layer including a biaxially stretched thermoplastic film and a uniaxially stretched thermoplastic resin film containing from 8 to 65 wt % fine inorganic particles.

14. The recording sheet as claimed in claim 13, wherein the fine inorganic particles are selected from the group consisting of calcium carbonate, calcined clay, silica, diatomaceous earth, talc, titanium oxide and barium sulfate having a particle diameter of from 0.03 to 16 μm.

15. The recording sheet as claimed in claim 13, wherein the microporous synthetic paper has a thickness of from 20 to 300 μm.

16. The recording sheet as claimed in claim 1, wherein the adhesive is a polyurethane-based or polyester-based liquid anchor coating agent.

17. The recording sheet as claimed in claim 1, further comprising an opacifying layer (D) having a thickness of 1 to 5 μm disposed on one or both sides of the stretched resin film (B).

* * * * *